(12) United States Patent
Hsu

(10) Patent No.: US 6,240,824 B1
(45) Date of Patent: Jun. 5, 2001

(54) BLIND CUTTING MACHINE

(75) Inventor: P. S. Hsu, Changhua Hsien (TW)

(73) Assignee: Ching Feng /Blinds Ind. Co., Ltd., Changhua Hsien (TW)

( * ) Notice: Subject to any disclaimer, the term of this patent is extended or adjusted under 35 U.S.C. 154(b) by 0 days.

(21) Appl. No.: 09/352,945

(22) Filed: Jul. 14, 1999

(51) Int. Cl.$^7$ .................................................. B23D 23/00
(52) U.S. Cl. ................................ 83/622; 83/636; 29/24.5
(58) Field of Search ........................... 83/198, 618, 622, 83/636; 29/24.5

(56) References Cited

U.S. PATENT DOCUMENTS

| | | | |
|---|---|---|---|
| 5,339,716 | * | 8/1994 | Sands et al. ........................... 29/24.5 |
| 5,799,557 | * | 9/1998 | Wang ..................................... 29/24.5 |
| 5,806,394 | * | 9/1998 | Marocco ................................ 83/622 |
| 5,816,126 | * | 10/1998 | Pluber ..................................... 29/24.5 |
| 5,927,172 | * | 7/1999 | Wang ..................................... 83/454 |

\* cited by examiner

Primary Examiner—Kenneth E. Peterson
Assistant Examiner—Melissa L. Hall
(74) Attorney, Agent, or Firm—Bacon & Thomas, PLLC

(57) ABSTRACT

A blind cutting machine including a working bench, a mold, a blade tool mechanism, a power mechanism and a restriction mechanism. The working bench is formed with an escape slot and a middle portion of the working bench is marked with scales. The mold is L-shaped. An upper end of the vertical section of the mold is formed with a forward extending outer slide rail and three perforations with different profiles in accordance with the profiles of the weight board, slat and upper beam of the blind. A horizontal section of the mold is formed with several thread holes. The blade tool mechanism includes a weight board blade tool, a slat blade tool, an upper beam blade tool and two pull bar assemblies. The power mechanism includes an eccentric wheel, a pivot shaft, a handle, two locating seats, a linkage assembly and a pulley. The restriction mechanism includes a thread rod, a restriction bar, two support members and a crank. By driving the eccentric wheel one time, the upper beam, slat and weight board can be respectively sequentially cut off at three stages. Therefore, the cutting operation can be performed with the strength saved.

1 Claim, 6 Drawing Sheets

BLIND CUTTING MACHINE

BACKGROUND OF THE INVENTION

The present invention relates to a blind cutting machine in which the cutting operation is divided into three stages and the upper beam, slat and weight board are sequentially cut into a desired size at one time at the three stages. Therefore, the cutting operation can be performed without great force so that the strength is saved and the manufacturing cost is lowered.

FIGS. 1 and 2 show a conventional blind cutting machine which includes:

a bench assembly 10 including a working bench 11, a mold seat 12 and several screws 13, the mold seat 12 being fixed on a left rear side of the working bench 11 and formed with several thread holes 121;

three blade molds 20 having identical size and profile, one side of each blade mold 20 being formed with a slide channel 21, the centers of the three blade molds being respectively formed with perforations 22 with different profiles in accordance with the different profiles of the weight board A, slat B and upper beam C, the three blade molds 20 being sequentially locked on the mold seat 12 by the screws 13;

an oil pressure device 30 including an oil pressure cylinder 31, a blade seat 32 and a thread rod 33, the blade seat 32 being fixed at front end of an oil pressure rod of the oil pressure cylinder 31, a front section of the blade seat 32 being formed with a longitudinal fissure 321, the thread rod 33 being screwed into one side of the blade seat 32;

a blade tool 34 which is an elongated plate body formed with two blade perforations 341, the most forward end of the blade 34 and the right sides of the two blade perforations 341 being respectively formed with blades 342 with different profiles in accordance with the different profiles of the weight board A, slat B and upper beam C, a locking section 343 extending from a rear end of the blade tool 34, the blade tool 34 being fitted in the slide channels 21 of the three blade molds 20 and fixed on the blade seat 32 at the locking section 343 by the thread rod 33; and a restriction mechanism 40 including a restriction bar 41, a locating screw 42, a ruler rod 43, a locating rod 44 and two support members 45. The restriction bar 41 is formed with three locating recesses 411. One end of the restriction bar 41 is formed with a polygonal pivot head 412 having a thread hole for the locating screw 42 to screw therein. The ruler rod 43 is marked with scales. Via the pivot head 412, the restriction bar 41 is pivotally disposed on the ruler rod 43. The ruler rod 43 and the locating rod 44 are fixedly connected between the two support members 45.

Referring to FIG. 2, in use, the restriction bar 41 of the restriction mechanism 40 is first adjusted to a desired position and located by the locating screw 42. Then the sections of the weight board A, slat B and upper beam C to be cut are respectively passed through the perforations 22 of the blade molds 20 to engage in the locating recesses 411 of the restriction bar 41. Then the oil pressure device 30 is activated, making the blade tool 34 fixed thereon move forward. At this time, the blades 342 of the blade tool 34 at one time cut off the sections of the weight board A, slat B and upper beam C passing through the perforations 22 of the blade mold 20.

The above conventional structure has some shortcomings as follows: 1. The weight board A, slat B and upper beam C are cut at one time so that the cutting area is larger and the required application force is greater; and 2. The greater application force necessitates the oil pressure device 30 to drive the blade tool 34 for cutting. This increases the manufacturing cost.

SUMMARY OF THE INVENTION

It is therefore a primary object of the present invention to provide a blind cutting machine in which the cutting operation is divided into three stages and the upper beam, slat and weight board are sequentially cut at one time at the three stages. Therefore, the cutting area is smaller and the cutting operation can be performed without great force so that the strength is saved.

It is a further object of the present invention to provide the above blind cutting machine which has simple structure and can be operated manually without oil pressure device so that the manufacturing cost is lowered.

The present invention can be best understood through the following description and accompanying drawings wherein:

DETAILED DESCRIPTION OF THE PREFERRED EMBODIMENT

Figure 1:
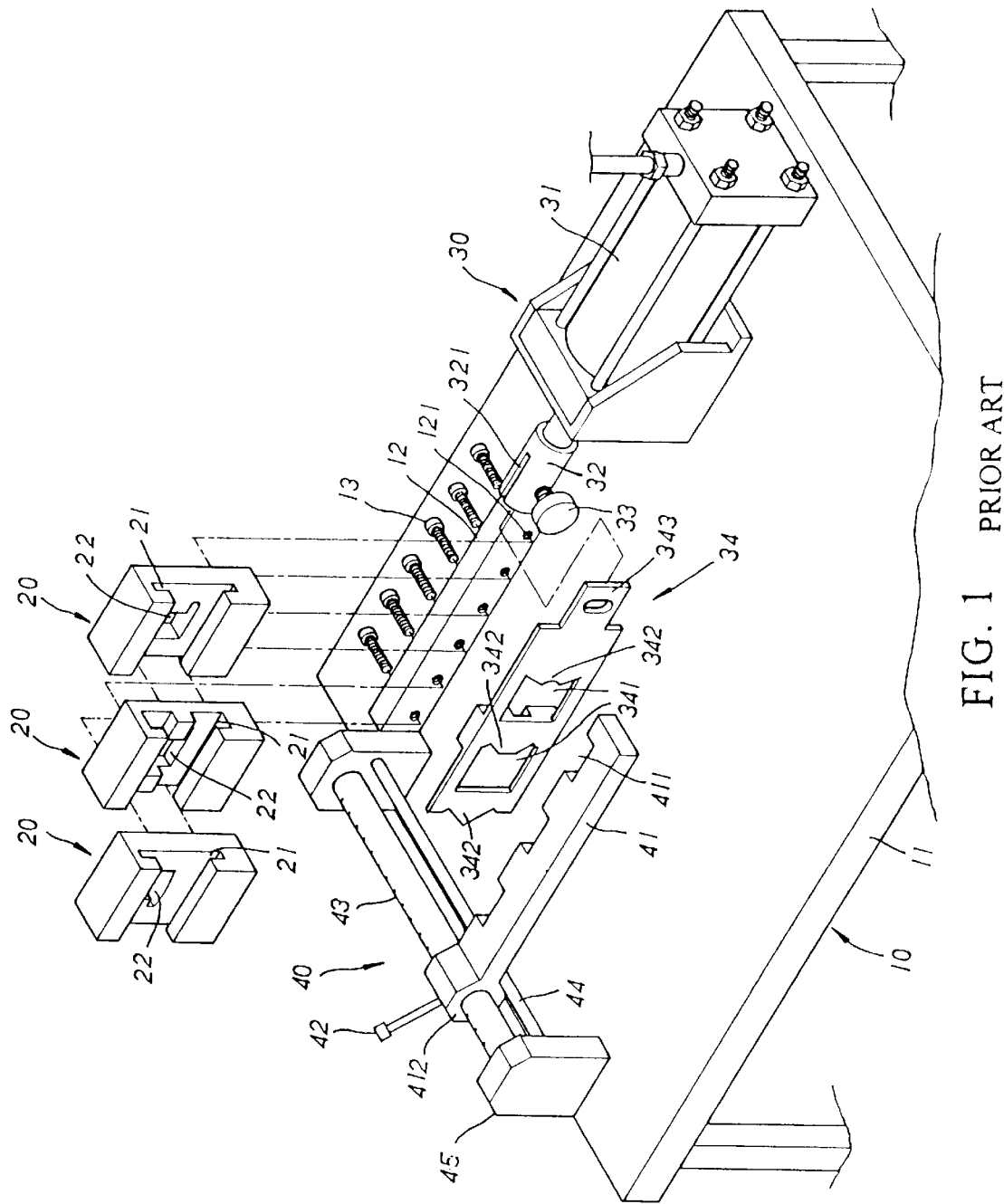
FIG. 1 is a perspective exploded view of a conventional blind cutting machine.
Figure 2:
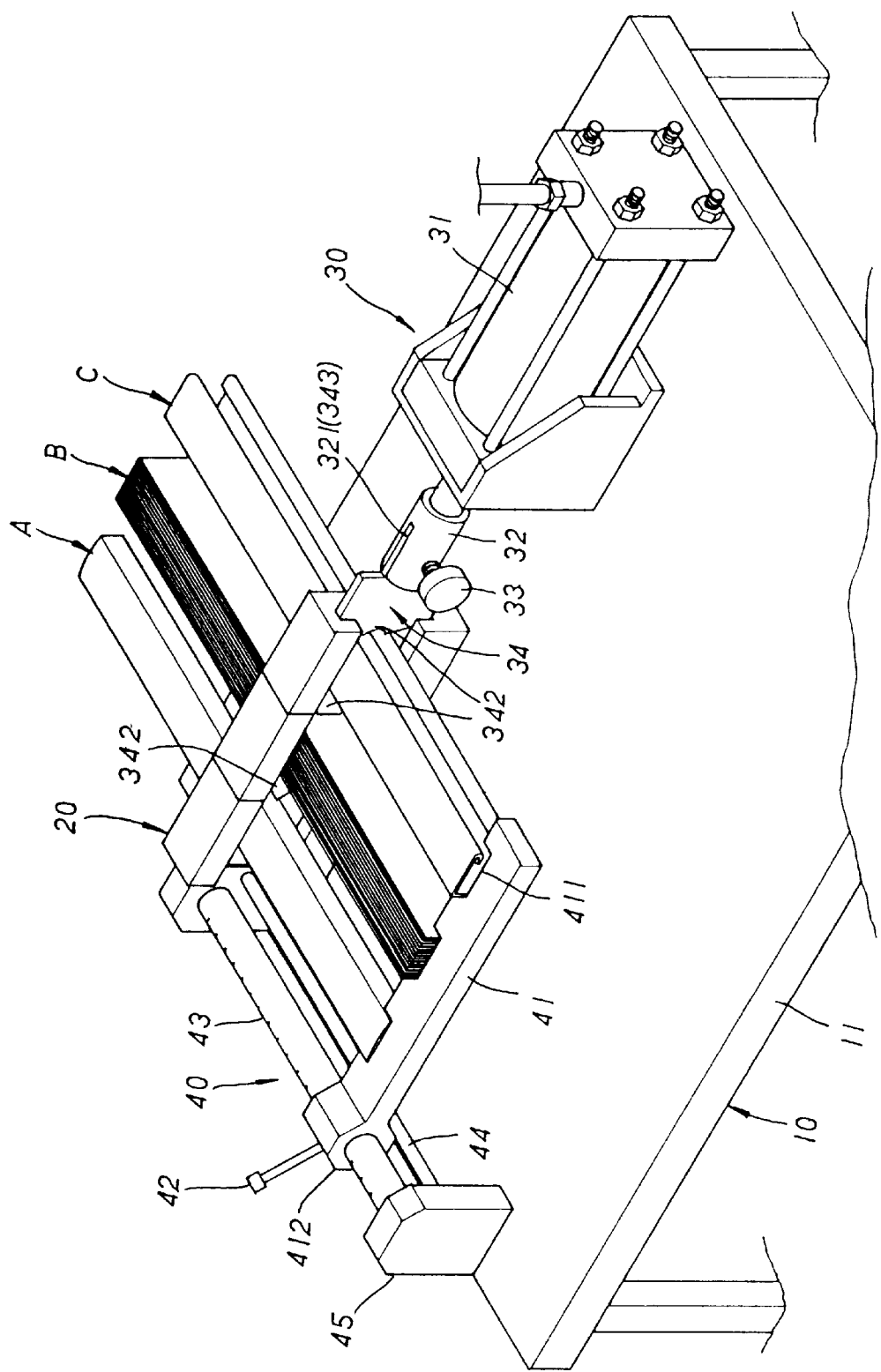
FIG. 2 is a perspective assembled view of the conventional blind cutting machine.
Figure 3:
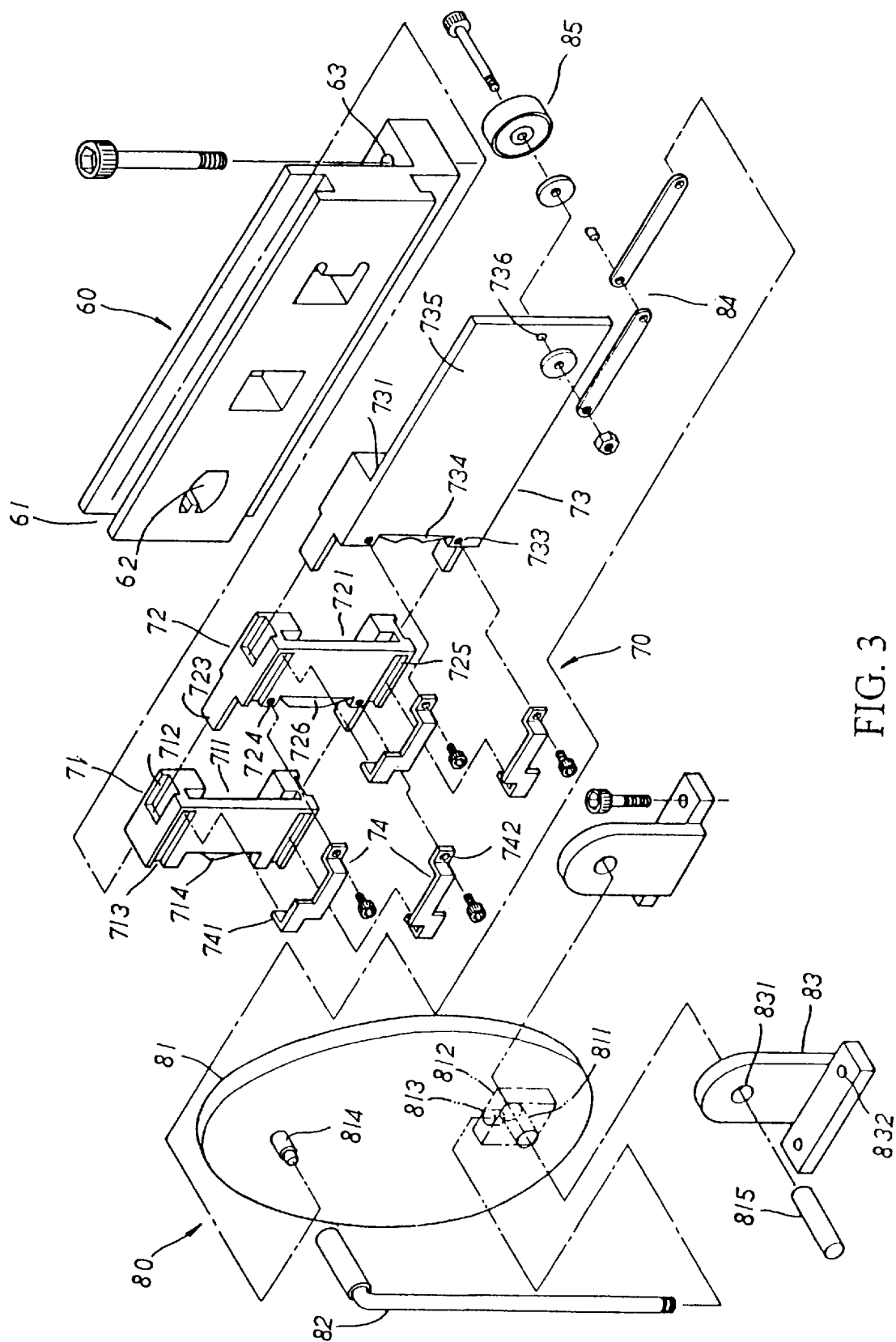
FIG. 3 is a perspective exploded view of the blind cutting machine of the present invention.
Figure 4:
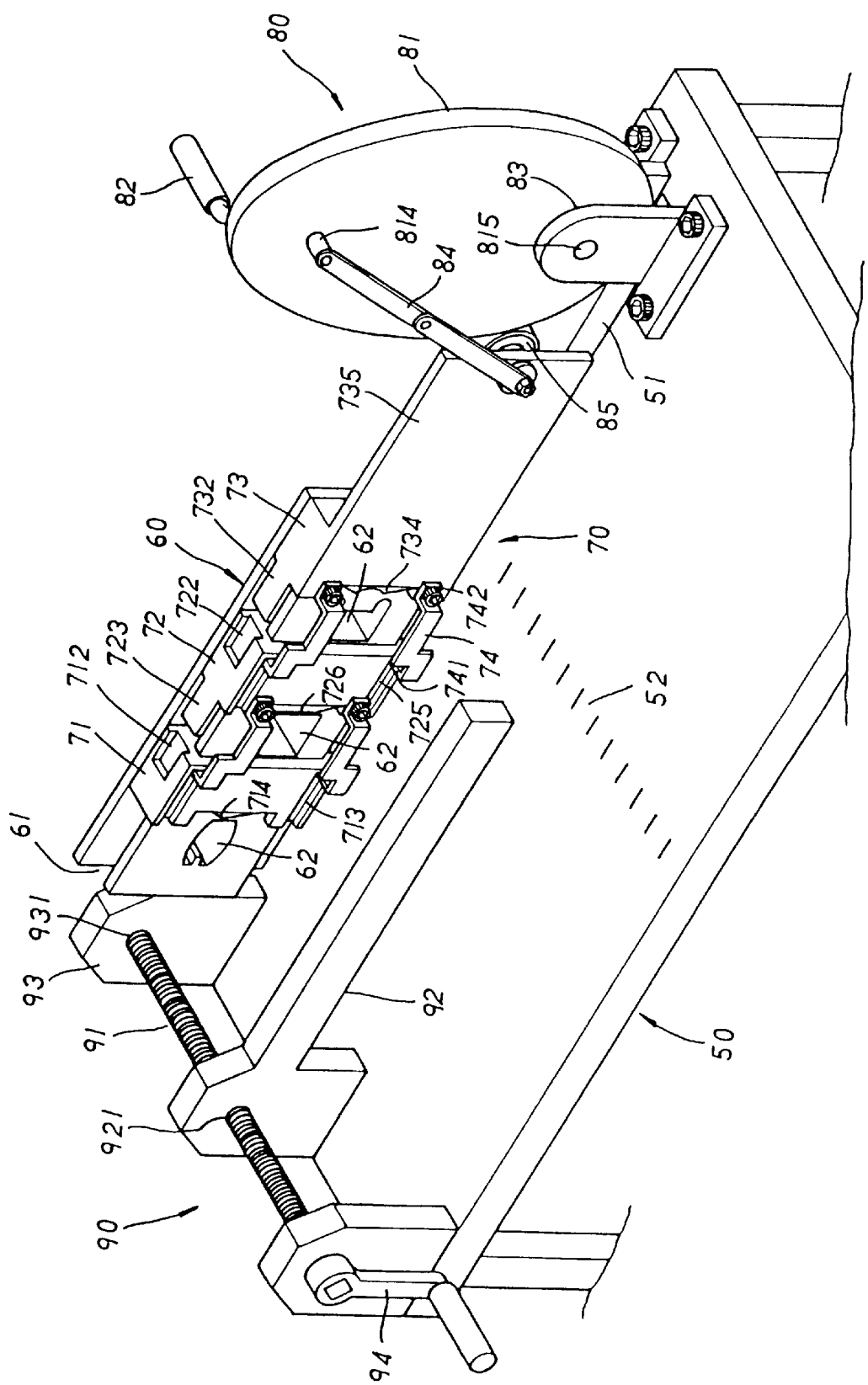
FIG. 4 is a perspective assembled view of the blind cutting machine of the present invention.

Please refer to FIGS. 3 and 4. The present invention includes a working bench 50, a mold 60, a blade tool mechanism 70, a power mechanism 80 and a restriction mechanism 90.

The working bench 50 is formed with an escape slot 51 and marked with scales 52 at a middle portion.

The mold 60 is L-shaped. An upper end of the vertical section of the mold 60 is formed with a longitudinal slide rail 61. In addition, the vertical section of the mold 60 is formed with three perforations 62 with different profiles in accordance with the profiles of the weight board A, slat B and upper beam C. The horizontal section of the mold 60 is formed with several thread holes 63.

The blade tool mechanism 70 includes a weight board blade tool 71, a slat blade tool 72, an upper beam blade tool 73 and two pull bar assemblies 74. The back face of the weight board blade tool 71 is formed with a T-shaped inner slide rail 711. The upper and lower ends of the right side thereof are each respectively formed with a push recess 712. The upper and lower ends of the front face thereof are each respectively formed with a pull channel 713. The left end is disposed with a blade 714. The back face of the slat blade tool 72 is formed with a T-shaped inner slide rail 721. The upper and lower ends of the right side thereof are each respectively formed with a push recesses 722. The upper and lower ends of the left side are each respectively formed with a push extension 723. The upper and lower ends of the front face thereof are each respectively formed with a locking hole 723 and a pull channel 725. The left end is disposed with a blade 726. The back face of the upper beam blade tool 73 is formed with a T-shaped inner slide rail 731. The upper and lower ends of the left side are each respectively formed with a push extension 732. The upper and lower ends of the front face thereof are each respectively formed with a locking hole 733. The left end is disposed with a blade 734. The right end has an extending connecting section 735 formed with a through hole 736. The pull bar assembly 74 includes an upper and a lower substantially Z-shaped member opposite to each other. The left side of each member has an inward extending engaging section 741. The right side has an outward extending L-shaped locking section 742.

The power mechanism 80 includes an eccentric wheel 81, a pivot shaft 815, a handle 82, two locating seats 83, a linkage assembly 84 and a pulley 85. The eccentric wheel 81 is formedwith an eccentric pivot hole 811 and a pull pin 814. One side of the pivot hole 811 is disposed with a handle seat 812 formed with a thread hole 813. Each locating seat 83 is L-shaped and formed with a pivot hole 831 and two thread holes 832.

The restriction mechanism 90 includes a thread rod 91, a restriction bar 92, two support members 93 and a crank 94. One end of the restriction bar 92 is enlarged and formed with a thread hole 921 for the thread rod 91 to screw therein. Each support member 93 is formed with a pivot hole 931 for two ends of the thread rod 91 to pivotally fit therein. The crank 94 is fixed at one end of the thread rod 91.

Referring to FIG. 4, when assembled, via the support members 93, the restriction mechanism 90 is fixed on the working bench 50. The horizontal section of the mold 60 is locked on the working bench 50 by screws. Thereafter, the upper beam blade tool 73, slat blade tool 72 and weight board blade tool 71 are respectively via the inner slide rails 731, 721, 711 sequentially slid into the outer slide rail 61 of the mold 60. Then the engaging sections 741 on left sides of the pull bar assemblies 74 are respectively positioned into the pull channels 713 of the weight board blade tool 71 and the pull channels 725 of the slat blade tool 72. The locking sections 742 on right sides thereof are respectively locked at the locking holes 724 of the slat blade tool 72 and the locking holes 733 of the upper beam blade tool 73 by screws. The locating seat 83 of the power mechanism 80 is locked on the working bench 50 by screws. The eccentric wheel 81 via the pivot shaft 815 is pivotally connected between the two locating seats 83. The handle 82 is locked at the thread hole 813 of the handle seat 812 on one side of the eccentric wheel 81. One end of the linkage assembly 84 is pivotally connected with the pull pin 814, while the other end thereof and the pulley 85 are pivotally connected at the through hole 736 of the connecting section 735 of the weight board blade tool 73 by screw.

Figure 5:
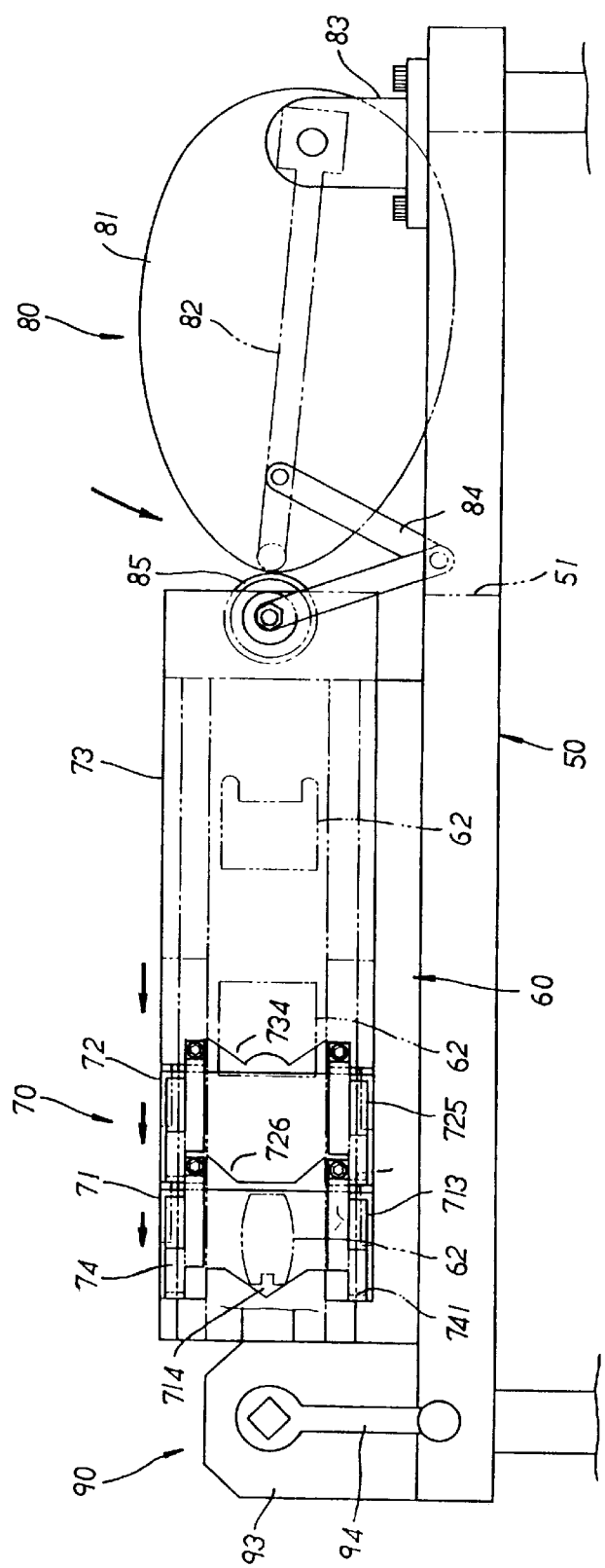
FIG. 5 is a side view showing that the cutting machine of the present invention is moved forward.
Figure 6:
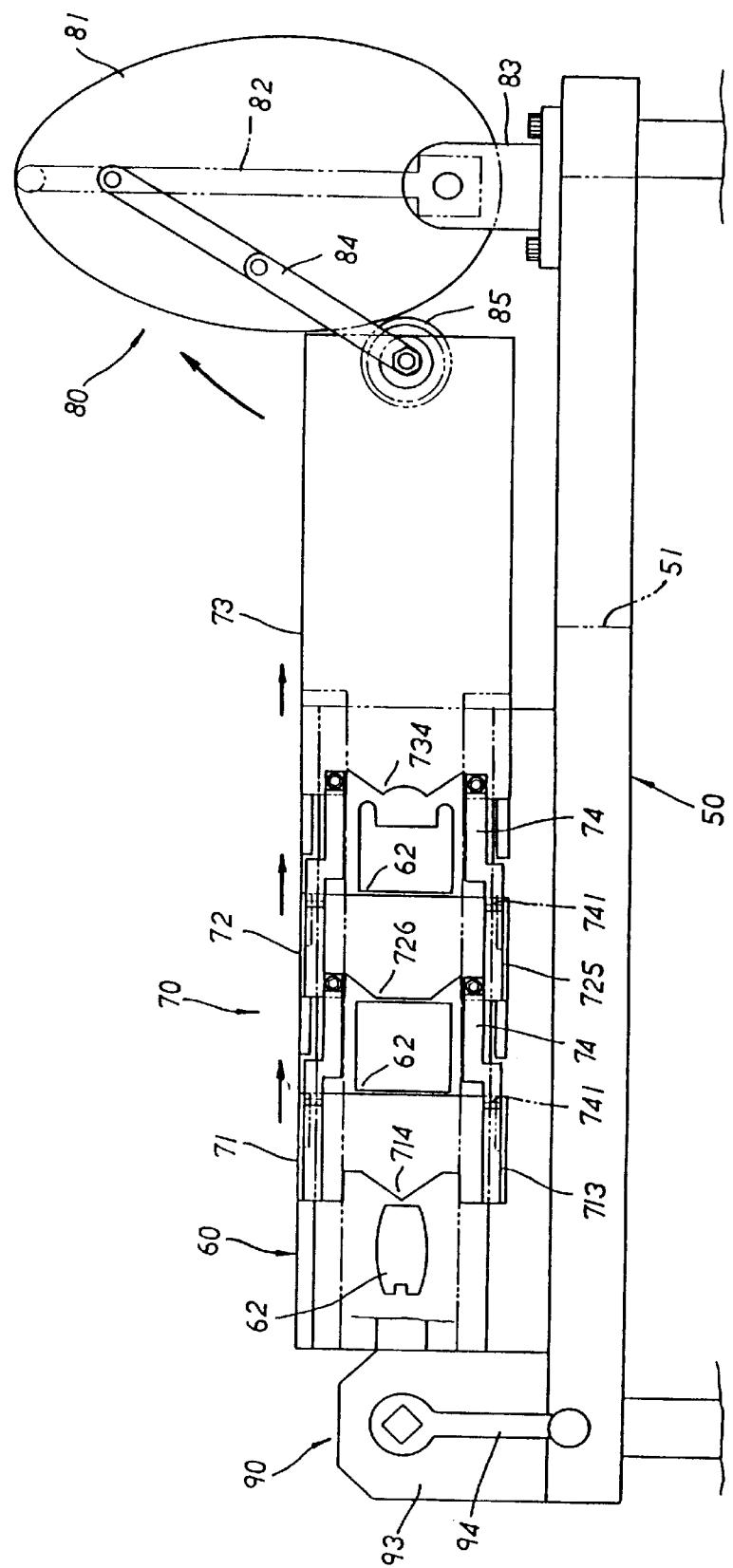
FIG. 6 is a side view showing that the cutting machine of the present invention is moved backward.

In cutting, as shown in FIG. 5, by means of the crank 94 of the restriction mechanism 90, the restriction bar 92 is moved to a desired position. Then the sections of the weight board A, slat B and upper beam C to be cut are respectively passed through the perforations 62 of the mold 60 to lean against the restriction bar 92. A force is then exerted onto the handle 82 of the power mechanism 80 (at this time the linkage assembly 84 is bent), making the eccentric wheel 81 deflect forward to press against the pulley 85. The upper beam blade tool 73 is then pushed forward to cut off the upper beam C via the blade 734. Then the push extension 732 of the upper beam blade tool 73 is engaged into the push recess 722 of the slat blade tool 72 to push the slat blade tool 72 forward. The slat blade tool 72 then via the blade 726 cuts off the slat B. Then the push extension 723 of the slat blade tool 72 is engaged into the push recess 712 of the weight board blade tool 71 to push the weight board blade tool 71 forward. The weight board blade tool 71 then via the blade 714 cuts off the weight board A. When retracted, as shown in FIG. 6, the handle 82 of the power mechanism 80 is pulled back so as to via the linkage assembly 84 pull back the upper beam blade tool 73. Then the upper beam blade tool 73 via the pull bar assembly 74 locked at the locking hole 733 pulls back the slat blade tool 72. Similarly, the slat blade tool 72 via the pull bar assembly 74 locked at the locking hole 724 pulls back the weight board blade tool 71. Accordingly, the upper beam blade tool 73, slat blade tool 72 and weight board blade tool 71 can be sequentially pulled back.

The present invention has the following advantages: 1. After the upper beam is cut off by the upper beam blade tool, the slat blade tool is pushed forward for cutting off the slat. Then the weight board blade tool is pushed forward to cut off the weight board. Therefore, the cutting operation is divided into three stages and the cutting area at one time is smaller. Therefore, the cutting operation can be performed without great force and the strength can be saved; 2. The cutting machine has simple structure and can be operated manually without oil pressure device so that the manufacturing cost is lowered.

The above embodiment is only used to illustrate the present invention, not intended to limit the scope thereof. Many modifications of the above embodiment can be made without departing from the spirit of the present invention.

What is claimed is:

1. A blind cutting machine comprising a working bench, a mold, a blade tool mechanism, a power mechanism and a restriction mechanism, wherein the working bench is marked with scales at a middle portion and the mold is L-shaped, a vertical section of the mold being formed with three perforations with different profiles corresponding to the profiles of a weight board, a slat and an upper beam of a blind, a horizontal section of the mold being formed with several thread holes, the blade tool mechanism including a weight board blade tool, a slat blade tool, an upper beam blade tool and two pull bar assemblies, the power mechanism including an eccentric wheel, a pivot shaft, a handle, two locating seats, a linkage assembly and a pulley, the restriction mechanism including a thread rod, a restriction bar, two support members and a crank, one end of the restriction bar being enlarged and formed with a thread hole for the thread rod to screw therein, each support member being formed with a pivot hole for two ends of the thread rod to pivotally fit therein, said cutting machine being characterized in that:

the working bench is formed with an escape slot;

an upper end of the vertical section of the mold is formed with a forward extending outer slide rail;

a back face of the weight board blade tool is formed with an inner slide rail, an upper end and a lower end of a right side of the weight board blade tool being each respectively formed with two push recesses, an upper end and a lower end of a front face of the weight board blade tool being each respectively formed with a pull channel, a left end of the weight board blade tool being disposed with a blade, a back face of the slat blade tool being formed with an inner slide rail, an upper end and a lower end of a right side of the slat blade tool being each respectively formed with a push recess, an upper end and a lower end of a left side of the slat blade tool being each respectively formed with a push extension, an upper end and a lower end of the front face of the slot blade tool being each respectively formed with a locking hole and a pull channel, a left end of the slat blade tool being disposed with a blade, a back face of the upper beam blade tool being formed with an inner slide rail, an upper end and a lower end of the left side of the upper beam blade tool being each respectively formed with a push extension, an upper end and a lower end of a front face of the upper beam blade tool being each respectively formed with a locking hole, a left end of the upper beam blade tool being disposed with a blade, a right end of the upper beam blade tool having an extending connecting section formed with a throughhole, each pull bar assembly including an upper and a lower substantially Z-shaped member opposite to each other, a left side of each-member having an inward extending engaging section, a right side of each member having an outward extending locking section;

the eccentric wheel is formed with an eccentric pivot hole and a pull pin, one side of the pivot hole being disposed with a handle seat formed with a thread hole, each locating seat being formed with a pivot hole and two thread holes; and the mold is locked on the working bench by a plurality of screws, the upper beam blade tool, slat blade tool and weight board blade tool being respectively via the inner slide rails sequentially slid into the outer slide rail of the mold, the engaging sections of the pull bar assemblies being respectively positioned into the pull channels of the weight board blade tool and the pull channels of the slat blade tool, the locking sections of the pull bar assemblies being respectively locked at the locking holes of the slat blade tool and the locking holes of the upper beam blade tool by a plurality of screws, the locating seat of the power mechanism being locked on the working bench by a plurality of screws, the eccentric wheel via the pivot shaft being pivotally connected between the two locating seats, the handle being locked at the thread hole of the handle seat, one end of the linkage assembly being pivotally connected with the pull pin, while the other end thereof and the pulley being pivotally connected with the connecting section of the weight board blade tool, and the crank of the restriction mechanism being fixed at one end of the thread rod.

\* \* \* \* \*